US012762141B2

(12) United States Patent
Tani et al.

(10) Patent No.: US 12,762,141 B2
(45) Date of Patent: Oct. 13, 2026

(54) INFORMATION PROCESSING SYSTEM AND INFORMATION PROCESSING METHOD

(71) Applicant: SEMICONDUCTOR ENERGY LABORATORY CO., LTD., Atsugi (JP)

(72) Inventors: Chizuko Tani, Ebina (JP); Junpei Momo, Sagamihara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 19/017,905

(22) Filed: Jan. 13, 2025

(65) Prior Publication Data

US 2025/0231956 A1 Jul. 17, 2025

(30) Foreign Application Priority Data

Jan. 17, 2024 (JP) ................................ 2024-005544

(51) Int. Cl.
*G06F 16/25* (2019.01)
*G06F 16/9032* (2019.01)
*G06F 16/93* (2019.01)

(52) U.S. Cl.
CPC ...... *G06F 16/254* (2019.01); *G06F 16/90332* (2019.01); *G06F 16/93* (2019.01)

(58) Field of Classification Search
None
See application file for complete search history.

(56) References Cited

U.S. PATENT DOCUMENTS

| | | | | |
|---|---|---|---|---|
| 2025/0053804 | A1* | 2/2025 | Naressi | G06N 3/045 |
| 2025/0139382 | A1* | 5/2025 | Mohammed | G06F 40/40 |
| 2025/0156653 | A1* | 5/2025 | Yuan | G06F 16/3347 |

OTHER PUBLICATIONS

Liu.Y et al., "Summary of ChatGPT/GPT-4 Research and Perspective Towards the Future of Large Language Models", arXiv:2304.01852, Apr. 4, 2023, pp. 1-35, Cornell University.

* cited by examiner

*Primary Examiner* — Thu N Nguyen
(74) *Attorney, Agent, or Firm* — Fish & Richardson P.C.

(57) ABSTRACT

A novel information processing system that is highly convenient, useful, or reliable is provided. The information processing system includes a first component, a second component, and a third component. In accordance with information transferred to the first component, the second component extracts a document related to the information from a specified data source and builds a first database including the document. Next, by first retrieval augmented generation processing using the second and third components, a document dedicated to information is newly generated on the basis of the document in the first database, and a second database including the newly generated document is built. Then, in accordance with a question sentence transferred from the first component, an answer sentence is generated on the basis of the document in the second database by second retrieval augmented generation processing using the second and third components.

6 Claims, 12 Drawing Sheets

INFORMATION PROCESSING SYSTEM AND INFORMATION PROCESSING METHOD

BACKGROUND OF THE INVENTION

1. Field of the Invention

One embodiment of the present invention relates to an information processing system and an information processing method.

Note that one embodiment of the present invention is not limited to the above technical field. The technical field of one embodiment of the invention disclosed in this specification and the like relates to an object, a method, or a manufacturing method. Alternatively, one embodiment of the present invention relates to a process, a machine, manufacture, or a composition of matter. Specifically, examples of the technical field of one embodiment of the present invention disclosed in this specification include a semiconductor device, a display apparatus, a light-emitting apparatus, a power storage device, a memory device, a method for driving any of them, and a method for manufacturing any of them.

2. Description of the Related Art

In recent years, language models using neural networks have been actively developed, and a large language model (LLM) has particularly attracted attention. A large language model is a natural language processing model learned using a large amount of data. With a large language model, for example, an interactive model for responding to a user's instructions can be achieved. In Non-Patent Document 1, Generative Pre-trained Transformer 4 (GPT-4, the registered trademark) is disclosed as a large language model, and ChatGPT is disclosed as an interactive model.

By utilizing a large language model, the capability of a natural language processing model has been significantly increased. Meanwhile, it is difficult to incorporate and operate a language model by oneself in terms of facilities and costs due to hugeness of the language model. Accordingly, a language model provided by external service is generally used.

REFERENCE

Non-Patent Document

[Non-Patent Document 1] Yiheng Liu et al., Summary of ChatGPT/GPT-4 Research and Perspective Towards the Future of Large Language Models (Submitted on Apr. 4, 2023, [online] Internet URL: https://arxiv.org/abs/2304.01852

SUMMARY OF THE INVENTION

One object of one embodiment of the present invention is to provide a novel information processing system that is highly convenient, useful, or reliable. Another object of one embodiment of the present invention is to provide a novel information processing method that is highly convenient, useful, or reliable.

Note that the description of these objects does not preclude the presence of other objects. One embodiment of the present invention does not necessarily achieve all of these objects. Other objects will be apparent from and can be derived from the description of the specification, the drawings, the claims, and the like.

A large language model can automatically generate an answer to a user's question, but can only generate an answer based on information in a pre-learned range. Thus, an appropriate answer cannot be generated in some cases depending on a user's question content. For example, when a question dedicated to a task which the user is engaged in is asked to a large language model provided by an external service, it is highly probable that the large language model cannot generate the answer the user needs. This is because the large language model provided by the external service is generated by learning general public information (e.g., politics, economy, culture, science, society, and events) and has not learned internal information of a company the user belongs to, for example.

Meanwhile, a technique in which information related to the user's question sentence is searched for and extracted from external data (data that a large language model has not learned) to make the large language model generate an answer sentence on the basis of the information, i.e., a retrieval augmented generation (RAG) method, has been recently developed and widely utilized. This has allowed an answer the user needs to be generated even when a question regarding an unlearned region of the large language model is asked by extracting related information from an external information source.

However, in the case where there is a variety of forms, languages, file formats, and the like in the reference external data, information that the user needs cannot be accurately extracted from the external data, and as a result, the large language model might generate an irrelevant answer. Thus, first retrieval augmented generation processing is performed on the variety of reference external data, so that a first document in which the form, language, file format, and the like are adjusted is generated by the large language model. Then, second retrieval augmented generation processing is performed on the first document, so that a second document is generated by the large language model and presented to the user as the answer to the question. When a document is generated by performing retrieval augmented generation processing twice in this manner, the answer accuracy of the large language model can be improved as compared with the case where the retrieval augmented generation processing is performed only once. In other words, the answer the user needs can be appropriately generated.

For example, in the case where the user asks a question dedicated to an internal task and seeks for an appropriate answer to the question, an information source dedicated to internal information needs to be built in advance. In such a case, as described above, when an information processing system and an information processing method that each combine processing in which the information source is built in advance by the first retrieval augmented generation and processing in which the information source is subjected to the second retrieval augmented generation are established, the user can obtain an appropriate answer regardless of a question content.

In view of the above, one embodiment of the present invention is an information processing system including a first component; the first component has a function of receiving first information, second information, and a question sentence, a function of creating a first prompt on the basis of the first information, a function of inputting the first prompt to a large language model and receiving a list generated by the large language model, a function of extracting a first document from inside a data source on the basis of the first information and the second information, and a function of storing the first document in a first database; the first document is a document related to the first information; the data source is an information source specified by the second information; the list includes a chapter; the first component has a function of searching the first database and extracting a second document on the basis of the chapter, a function of creating a second prompt on the basis of the chapter and the second document, a function of inputting the second prompt to the large language model and receiving a third document generated by the large language model, and a function of storing the third document in a second database; the second document is a document related to the chapter; the first component has a function of searching the second database and extracting a fourth document on the basis of the question sentence; the fourth document is a document related to the question sentence; and the first component has a function of creating a third prompt on the basis of the fourth document and the question sentence, inputting the third prompt to the large language model and receiving an answer sentence generated by the large language model, and a function of outputting the answer sentence.

In the above, it is preferable that the first component have a function of converting the first document into first vector data, linking the first document and the first vector data to each other, and storing the first document and the first vector data in the first database, a function of converting the chapter into second vector data and performing a similarity search in the first database using the second vector data, a function of converting the third document into third vector data, linking the third document and the third vector data to each other, and storing the third document and the third vector data in the second database, and a function of converting the question sentence into fourth vector data and performing a similarity search in the second database using the fourth vector data.

Another embodiment of the present invention is an information processing method including a first step in which a first component receives first information and second information and then transfers the first information and the second information to a second component; a second step in which the second component receives the first information and the second information, then creates a first prompt on the basis of the first information, and transfers the first prompt to a third component; a third step in which the third component generates a list on the basis of the first prompt; a fourth step in which the second component searches a data source for the first information on the basis of the second information, where the data source is an information source specified by the second information; a fifth step in which the second component extracts a first document including the first information; a sixth step in which the second component receives the list; a seventh step in which the second component converts the first document into first data, then links the first document and the first data to each other, and stores the first document and the first data in a first database, where the list includes a first chapter; an eighth step in which the second component extracts the first chapter from the list and then converts the first chapter into second data; a ninth step in which the second component searches the first database for the second data; a tenth step in which the second component extracts a second document linked to third data from the first database, where the third data is most similar to the second data; an eleventh step in which the second component creates a second prompt on the basis of the first chapter and the second document and transfers the second prompt to the third component; a twelfth step in which the third component generates a third document on the basis of the second prompt; a thirteenth step in which the second component receives the third document from the third component; a fourteenth step in which the second component determines whether the list includes a second chapter; in the case where the second component determines that the list includes the second chapter, the second component performs processing in the eighth to the thirteenth steps on the second chapter; and in the case the second component determines that the list does not include the second chapter, in a fifteenth step, the second component converts the third document into fourth data, then links the third document and the fourth data to each other, and stores the third document and the fourth data in a second database.

In the above, it is preferable that the first data to the fourth data be vector data and in the ninth step, the search in the first database for the second data performed by the second component be a similarity search.

In the above, the information processing method includes after the fifteenth step a sixteenth step in which the first component preferably receives a question sentence and then transfers the question sentence to the second component; a seventeenth step in which the second component preferably converts the question sentence into fifth data and then searches the second database for the fifth data; an eighteenth step in which the second component preferably extracts a fourth document linked to sixth data from the second database, where the sixth data is most similar to the fifth data; a nineteenth step in which the second component preferably creates a third prompt on the basis of the question sentence and the fourth document and transfers the third prompt to the third component; a twentieth step in which the third component preferably generates an answer sentence on the basis of the third prompt and then transfers the answer sentence to the second component; a twenty-first step in which the second component preferably receives the answer sentence and then transfers the answer sentence to the first component; and a twenty-second step in which the first component preferably receives the answer sentence.

In the above, it is preferable that the fifth data and sixth data be vector data and in the seventeenth step, the search in the second database for the fifth data performed by the second component be a similarity search.

One embodiment of the present invention can provide a novel information processing system that is highly convenient, useful, or reliable. Another embodiment of the present invention can provide a novel information processing method that is highly convenient, useful, or reliable.

Note that the description of these effects does not preclude the existence of other effects. One embodiment of the present invention does not necessarily have all of these effects. Other effects will be apparent from and can be derived from the description of the specification, the drawings, the claims, and the like.

DETAILED DESCRIPTION OF THE INVENTION

Figure 1:
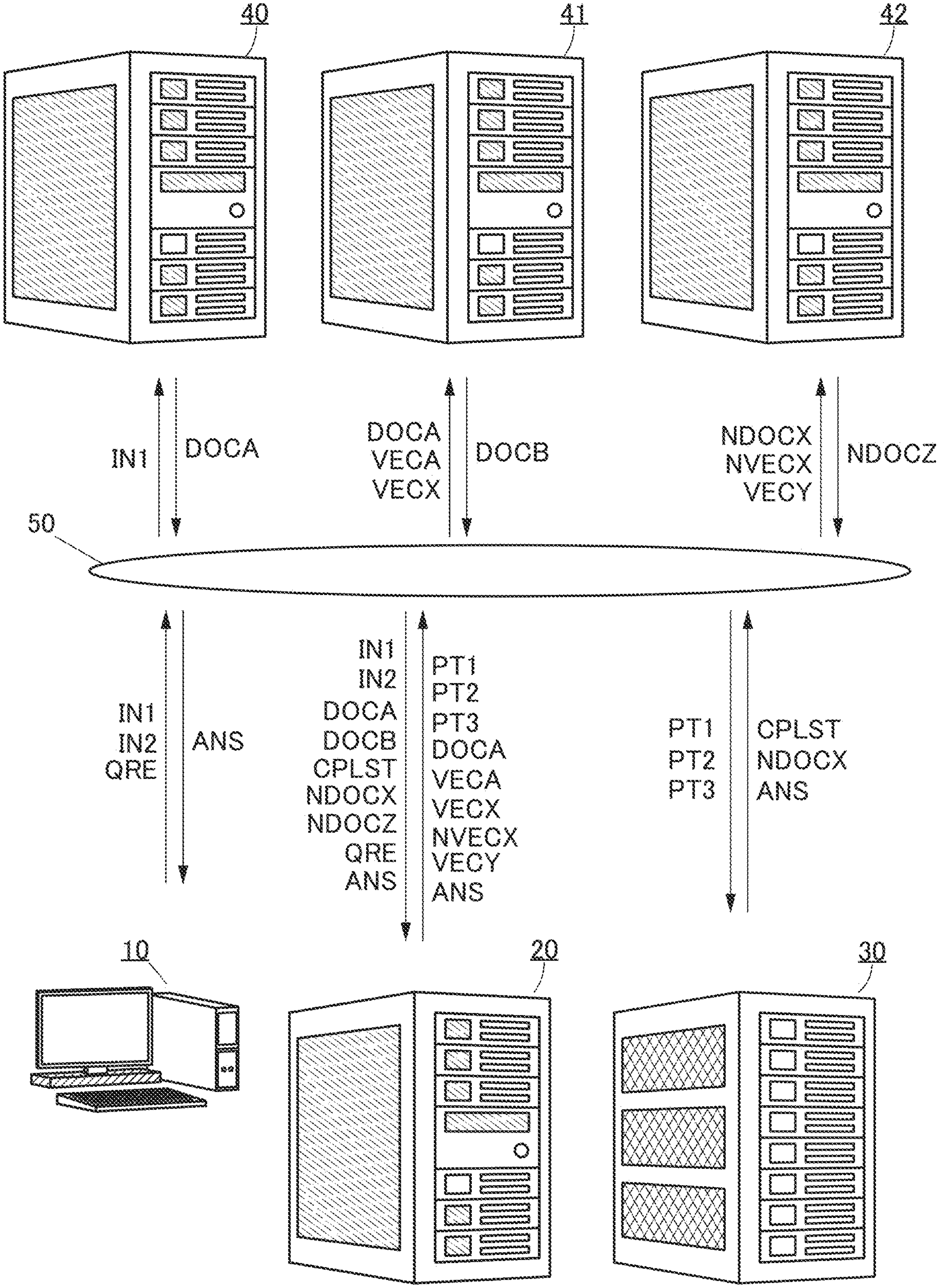
FIG. 1 is a diagram illustrating a structure of an information processing system.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. Therefore, the present invention should not be construed as being limited to the description in the following embodiments. Note that in structures of the invention described below, the same portions or portions having similar functions are denoted by the same reference numerals in different drawings, and the description thereof is not repeated.

Note that ordinal numbers such as "first" and "second" in this specification and the like are used for convenience and do not limit the number or the order (e.g., the order of steps or the stacking order) of constituent elements. The ordinal number added to a constituent element in a part of this specification may be different from the ordinal number added to the constituent element in another part of this specification or the scope of claims.

Embodiment 1

An information processing system of one embodiment of the present invention has a function of generating a list (a list of chapters (or sections) of a document created by the information processing system) with use of a large language model on the basis of first information (a user's purpose, a subject, or the like) input by the user. The information processing system has a function of extracting first text data (data related to the first information and text data included in a file group) from a data source (a database, a data folder, or both thereof) that is an information source specified by second information input by the user, converting the first text data into first vector data, then linking the first text data and the first vector data to each other, and storing them in a first database. Furthermore, the information processing system has a function of converting each of the names of the chapters (or the sections) included in the list into second vector data, then performing a similarity search in the first database, and extracting second text data linked to third vector data similar to the second vector data.

Note that in this specification and the like, "vector data" refers to data consisting of a multi-dimensional numerical array, whereas text data consists of a character string (a natural language) such as a text. The vector data can also be regarded as data in a format capable of arithmetic processing. Text data can be converted into vector data by performing quantification based on the features, regularity, or the like of the text data. As specific methods for converting text data into vector data, Bag of Words, distributed representations, embedded representations, and the like are known.

In this specification and the like, "similarity search" refers to searching for a high degree of similarity between the above-described pieces of vector data. As an example of an indicator representing the degree of similarity between the pieces of vector data, cosine similarity can be given.

Furthermore, as an indicator representing the degree of similarity between the pieces of vector data, a distance between the pieces of vector data can be used. In this case, it can be said that the closer the distance between the pieces of the vector data is, the higher the degree of similarity between the pieces of the vector data is. The distance between pieces of vector data is calculated using Euclidean distance, standard (standardized, average) Euclidean distance, Mahalanobis distance, Manhattan distance, Chebyshev distance, Minkowski distance, or the like.

The information processing system of one embodiment of the present invention has a function of generating, on the basis of the above-described list and the second text data, the first document whose form, language, file format, and the like are more adjusted than the first text data with use of the large language model. Furthermore, the information processing system has a function of converting the first document into fourth vector data, then linking the first document and the fourth vector data to each other, and storing them in a second database.

The information processing system of one embodiment of the present invention has a function of converting a question sentence input by the user into fifth vector data, then performing a similarity search in the second database, and extracting the second document linked to sixth vector data that is similar to the fifth vector data. Furthermore, the information processing system has a function of generating an answer sentence with the use of the large language model on the basis of the question sentence and the second document.

With the information processing system of one embodiment of the present invention having a variety of functions as described above, a highly accurate answer can be generated regardless of the user's question content.

Hereinafter, the information processing system of one embodiment of the present invention will be described with reference to FIG. 1 to FIG. 4.

<Structure Example of Information Processing System>

FIG. 1 illustrates structure examples of constituent elements of the information processing system of one embodiment of the present invention, various kinds of databases, and a network connecting these constituent elements. An example of a flow of data that is transmitted between the constituent elements of the information processing system and various kinds of the databases will be described.

Figure 2:
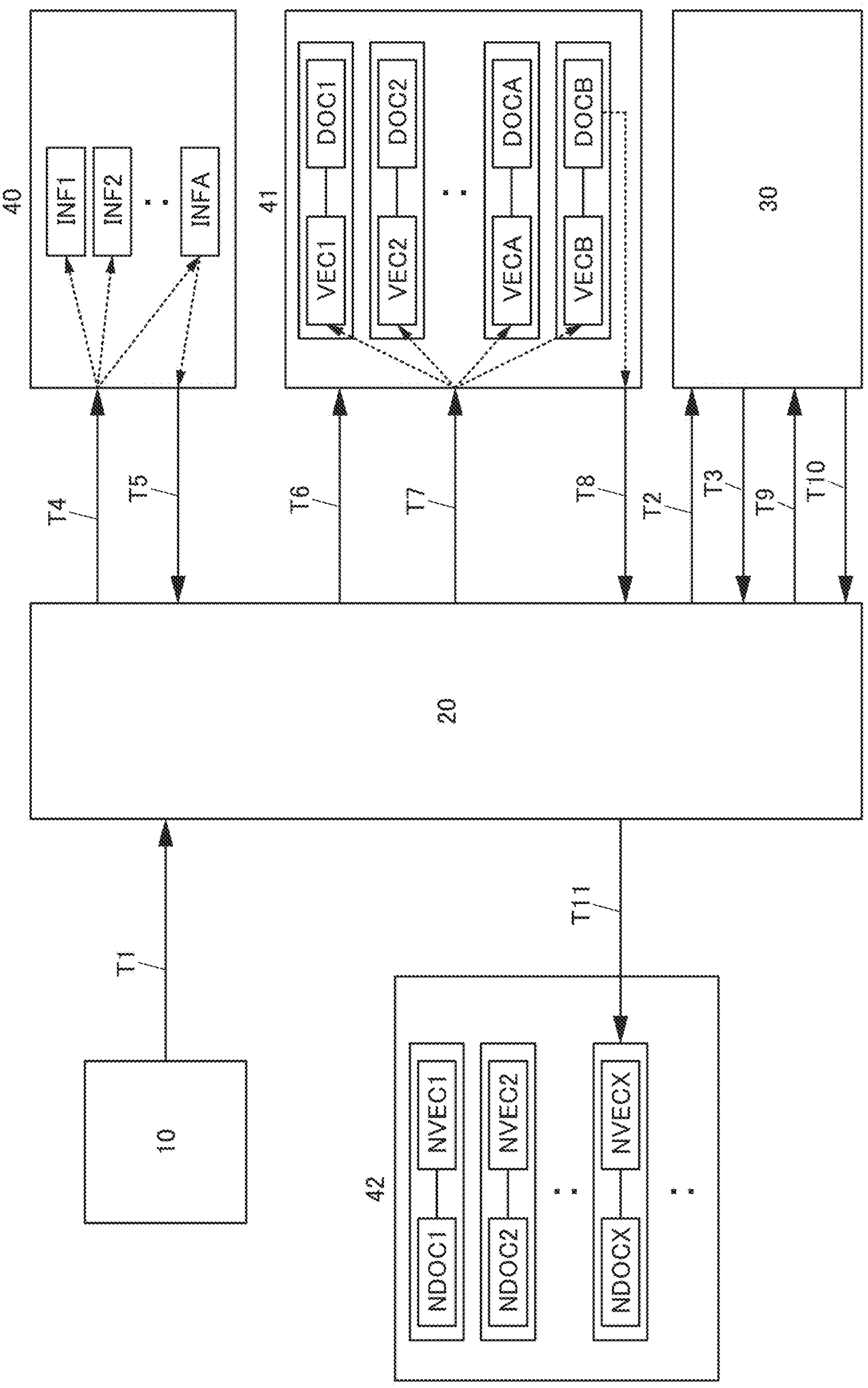
FIG. 2 is a block diagram illustrating a structure of an information processing system.
Figure 3:
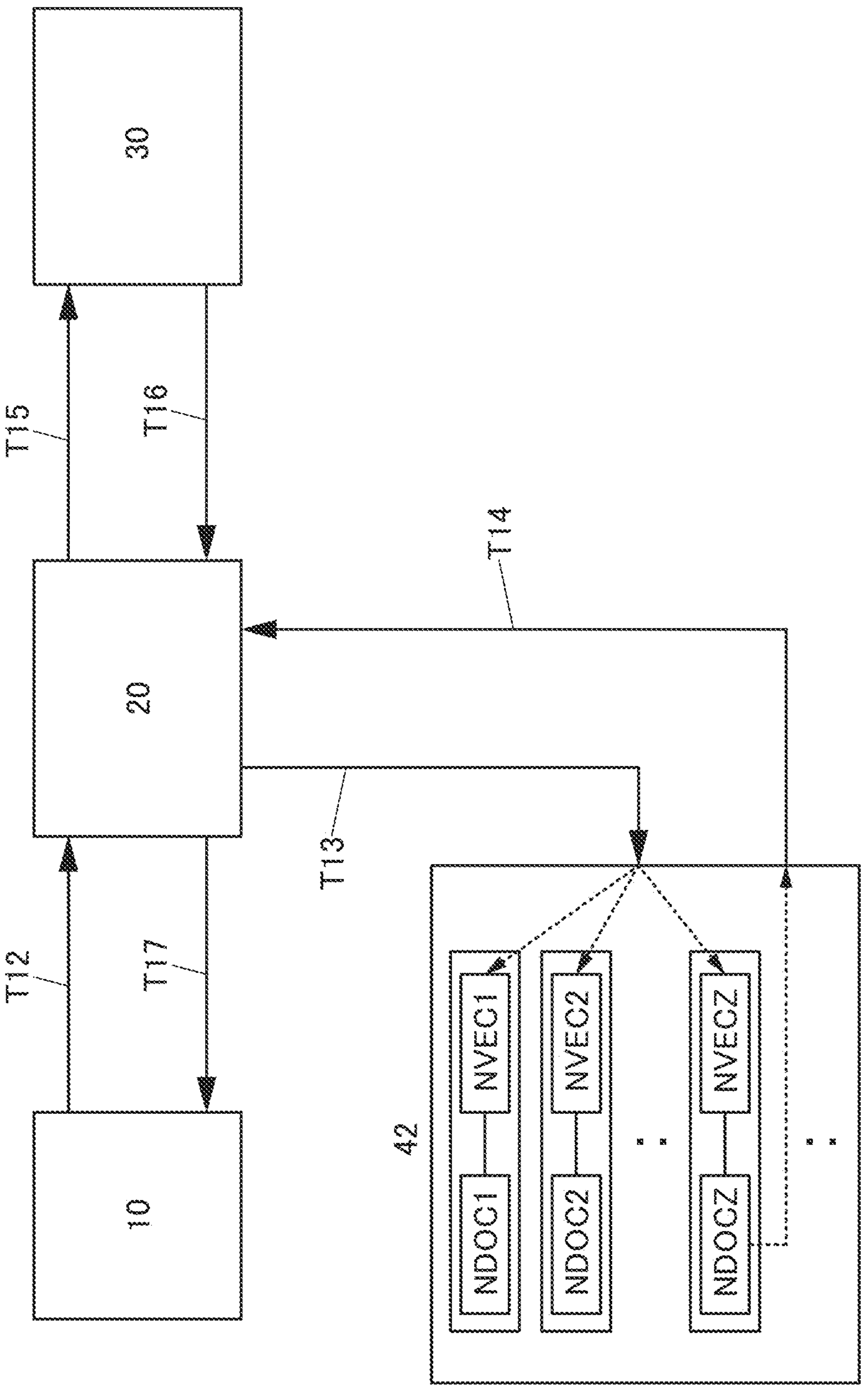
FIG. 3 is a block diagram illustrating a structure of an information processing system.

FIG. 2 and FIG. 3 each illustrate a more detailed example of the flow of data that is transmitted between the constituent elements of the information processing system and various kinds of the databases illustrated in FIG. 1.

Although FIG. 1 to FIG. 3 each illustrate constituent elements classified by their functions in independent components or blocks, it is difficult to classify actual constituent elements completely on the basis of their functions, and one constituent element can have a plurality of functions.

As illustrated in FIG. 1, the information processing system of one embodiment of the present invention includes a component 10, a component 20, and a component 30. The information processing system transmits predetermined data among a data source 40, a primary database 41, and a secondary database 42 via a network 50. The information processing system can perform document generation by a retrieval augmented generation method in conjunction with the data source 40, the primary database 41, and the secondary database 42.

The information processing system of one embodiment of the present invention performs document generation by the retrieval augmented generation method twice. First, information related to an input sentence (specifically, an item, a keyword, a purpose, a subject, or the like related to a user's question content) of the user is extracted from a database, a data folder, or a data source corresponding to both thereof (the data source 40) specified by the user, and the first database (the primary database 41) including the information is built. Next, by the first retrieval augmented generation processing, a document dedicated to the user's question content is newly generated on the basis of the information in the primary database 41, and the second database (the secondary database 42) including the document is built. Then, by the second retrieval augmented generation processing, an answer sentence to the user's question sentence is generated on the basis of the document in the secondary database 42. In other words, the information processing system of one embodiment of the present invention can be regarded as performing processing in two phases, i.e., the database (the secondary database 42) including the document dedicated to the user's purpose, subject, and the like is built by the first retrieval augmented generation processing and then an appropriate answer that the user needs is generated on the basis of the document in the database by the second retrieval augmented generation processing. The retrieval augmented generation processing is performed twice in this manner, whereby the answer accuracy to the user's question can be improved as compared with the case where the retrieval augmented generation processing is performed only once.

In the above-described series of processing, FIG. 2 illustrates an example of the first phase, i.e., various types of data transmission until the secondary database 42 is built by the first retrieval augmented generation processing. FIG. 3 illustrates an example of the second phase, i.e., various types of data transmission until the answer to the user's question is generated by the second retrieval augmented generation processing.

The functions of the information processing system of one embodiment of the present invention will be described separately below on the component basis with reference to FIG. 1 to FIG. 3. Note that the description of the data transmission between the components is partly repeated in some cases.

<<Structure Example of Component 10>>

As the component 10, a desktop computer can be used, for example.

The component 10 can receive data input by the user. Furthermore, the component 10 can provide the user with data output by the component 20.

The user can access the information processing system through dedicated application software or a web browser, for example. Accordingly, the user can enjoy service using the information processing system of one embodiment of the present invention.

In processing T1 indicated by an arrow in FIG. 2, the component 10 has a function of receiving information (information IN1 and information IN2 illustrated in FIG. 1) input by the user and transferring the information to the component 20.

In processing T12 indicated by an arrow in FIG. 3, the component 10 has a function of receiving a question sentence (a question sentence QRE shown in FIG. 1) input by the user and transferring the question sentence to the component 20.

Note that the information IN1, the information IN2, and the question sentence QRE are written in a natural language. Although the information IN2 can be written in a natural language, processing corresponding to the input of the information IN2 can be performed by the user selecting a desired folder on a display screen of the component 10, for example.

Here, the information IN1 specifically refers to an item, a keyword, or the like related to the user's question content. Specifically, the information IN2 refers to the place (a database or a data folder) where information related to the user's question content is stored and indicates a name of the data source 40, a data storage path, or the like. The question sentence QRE refers to a text that describes the user's question content itself.

For example, the case where the user is an engineer engaging in circuit design is considered. The user may want to ask a question to the information processing system of one embodiment of the present invention in an attempt to perform programming for information necessary for circuit design using a language called AXEL but becomes unsure of some points in function writing. In this case, an item, a keyword, and the like related to the question correspond to the information IN1. For example, in the above case, the information IN1 corresponds to the purpose "I want to ask a question about an AXEL function", the subject "AXEL function", or the like. Here, the information IN1 can be one word, a list of a plurality of words, or a text.

The information IN2 corresponds to the place (a database name, a data folder name, or a data storage path) where information related to the question content is stored. For example, in the above case, the information IN2 can be a database name like the "data source 40", a folder name in the data source 40 like "AXEL", or a data storage path such as "//data source 40/circuit design/AXEL".

The question sentence QRE corresponds to the text that describes the question content itself asked by the user. For example, in the above case, the question sentence QRE can be written as the following expression: "Show how a variable length argument function is written in AXEL".

In processing T17 indicated by an arrow in FIG. 3, the component 10 has a function of receiving an answer sentence (an answer sentence ANS shown in FIG. 1) created by the component 20 and providing the answer sentence to the user. Note that the answer sentence ANS is written in a natural language.

<<Structure Example of Component 20>>

As the component 20, a workstation, a server computer, or a supercomputer can be used, for example.

The component 20 preferably has a function of a parallel computer. By using the component 20 as a parallel computer, large-scale computation necessary for artificial intelligence (AI) learning and inference can be performed, for example.

The component 20 can perform processing using a natural language processing model using AI.

For example, it is possible to execute processing using a natural language model (natural language processing) such as Bidirectional Encoder Representations from Transformers (BERT), Text-to-Text Transfer Transformer (T5), GPT-3, GPT-3.5, GPT-4, Language Model for Dialogue Applications (LaMDA), Pathways Language Model (PaLM), or Llama2.

In the processing T1 indicated by an arrow in FIG. 2, the component 20 has a function of receiving the information IN1 and IN2 transferred from the component 10.

The component 20 has a function of creating a prompt PT1 on the basis of the information IN1. The prompt PT1 is a sentence created on the basis of the information IN1 transferred from the component 10 to be transferred to the component 30. For example, a sentence written in a natural language such as "Since an explanatory document of the information IN1 is to be created, create a table of contents of the explanatory document" is created by the component 20 as the prompt PT1.

In processing T2 indicated by an arrow in FIG. 2, the component 20 has a function of transferring the prompt PT1 to the component 30 and making the component 30 execute processing to create a list (a list CPLST shown in FIG. 1) including an item and a keyword related to the content of the information IN1 in accordance with the prompt PT1.

Here, the list CPLST is a list of chapters (or sections) of a document to be generated by the retrieval augmented generation method by the information processing system of one embodiment of the present invention. For example, in the case where a keyword such as the above-described "AXEL function" is transferred from the component 10 to the component 20 as the information IN1, the component 20 creates the above-described prompt PT1 on the basis of the keyword. Then, the component 20 transfers the prompt PT1 to the component 30, and the component 30 automatically generates chapters (which may be referred to as sections, items, a table of contents, or titles) related to the information IN1, such as "overview of AXEL", "AXEL standard operation function", and "AXEL GUI operation function", and creates a list of the chapters as the list CPLST. Note that each chapter is written in a natural language.

In processing T3 indicated by an arrow in FIG. 2, the component 20 has a function of receiving the list CPLST generated by the component 30 on the basis of the prompt PT1.

In processing T4 indicated by an arrow in FIG. 2, the component 20 has a function of searching the data source 40 for information related to the information IN1 on the basis of the information IN2. In FIG. 2, information INF1 to information INFA (A is an integer greater than or equal to 3) are stored in the data source 40, and a state where each of the information is compared with the information IN1 is indicated by dashed arrows.

In processing T5 indicated by an arrow in FIG. 2, the component 20 has a function of detecting information related to the information IN1 from the information stored in the data source 40, extracting a document included in the information (a document DOCA shown in FIG. 1), and receiving the document. Here, the document DOCA is a document obtained by extracting only a text component from information (includes all formats of data such as text data, image data, and the like) related to the information IN1, which is included in the data source 40. In FIG. 2, information related to the information IN1, which is in the data source 40, is the information INFA, and a state where a text component corresponding to the above-described document DOCA is extracted from the information INFA is indicated by a dashed arrow.

In processing T6 indicated by an arrow in FIG. 2, the component 20 has a function of converting the document DOCA into vector data (vector data VECA shown in FIG. 1), linking the document DOCA and the vector data VECA to each other, and storing them in the primary database 41.

In processing T7 indicated by an arrow in FIG. 2, the component 20 has a function of converting one chapter (e.g., X-th (X is an integer greater than or equal to 1) chapter (hereinafter referred to as a chapter CPTX) counted from the beginning of a plurality of chapters included in the list CPLST) included in the list CPLST into vector data (vector data VECX shown in FIG. 1) and performing a similarity search in the primary database 41. For example, in the case where the list CPLST includes three chapters (only text data of names) of "overview of AXEL", "AXEL standard operation function", and "AXEL GUI operation function", the component 20 has a function of converting text data of "AXEL standard operation function", which is one chapter included in the list CPLST, into vector data and performing a similarity search in the primary database 41. In FIG. 2, vector data VEC1 to vector data VECB (B is an integer greater than or equal to 3) and a document DOC1 to a document DOCB linked thereto respectively are stored in the primary database 41, and a state where a similarity evaluation between the pieces of vector data (each of the pieces of the vector data VEC1 to the vector data VECB) and the vector data VECX is performed is indicated by dashed arrows.

Note that as an example of an indicator representing the degree of similarity between the pieces of vector data, the cosine similarity can be given. The cosine similarity is a commonly used indicator because it can be easily calculated by only calculating the inner product of two pieces of vector data. The cosine similarity is represented by a number greater than or equal to −1 and less than or equal to 1, and it can be determined that the closer the number is to 1, the higher the degree of similarity is.

In processing T8 indicated by an arrow in FIG. 2, the component 20 has a function of extracting the document that has been determined to have a high degree of similarity by the above similarity search (the document DOCB shown in FIG. 1) from the primary database 41 and receiving the document. In FIG. 2, a state where the document DOCB linked to the vector data VECB having a high degree of similarity to the vector data VECX is extracted is indicated by a dashed arrow. The vector data VECB can be vector data that is most similar to the vector data VECX by the above similarity search, for example.

Although FIG. 2 illustrates an example in which one piece of the vector data (the vector data VECB) is determined to have a high degree of similarity by the above similarity search, one embodiment of the present invention is not limited thereto. For example, documents linked to the top ten pieces of vector data that are determined to have high degrees of similarity by the above similarity search can be extracted. The number of pieces of vector data that is determined to have a high degree of similarity can be set freely by the user.

Alternatively, in the case where the cosine similarity is used as an indicator representing the degree of similarity in the above similarity search, for example, the degree of similarity can be regarded as high when the cosine similarity is greater than or equal to 0.8, and documents linked to the pieces of vector data having high degrees of similarity can be extracted. A cosine similarity value regarded as having a high degree of similarity can be set freely by the user.

In processing T9 indicated by an arrow in FIG. 2, the component 20 has a function of creating a prompt PT2 on the basis of the chapter CPTX and the document DOCB and a function of transferring the prompt PT2 to the component 30 and making the component 30 execute processing to generate a new document (a document NDOCX shown in FIG. 1) on the basis of the chapter CPTX and the document DOCB. For example, the component 20 creates a sentence written in a natural language such as "Create an explanatory sentence related to the chapter CPTX on the basis of the description in the document DOCB" as the prompt PT2 and transfers the prompt PT2 to the component 30. For example, in the case where the chapter CPTX is text data such as "AXEL standard operation function", the component 30 generates, as a new document NDOCX, an explanatory sentence that is more dedicated to a content related to "AXEL standard function" on the basis of the description in the document DOCB in accordance with the prompt PT2. For example, text data describing the item "AXEL standard function" is generated as the document NDOCX.

In processing T10 indicated by an arrow in FIG. 2, the component 20 has a function of receiving the document NDOCX newly generated by the component 30 on the basis of the prompt PT2.

In processing T11 indicated by an arrow in FIG. 2, the component 20 has a function of converting the document NDOCX transferred from the component 30 into vector data (vector data NVECX shown in FIG. 1), linking the document NDOCX and the vector data NVECX to each other, and storing them in the secondary database 42. FIG. 2 shows an example in which a document NDOC1, a document NDOC2, the document NDOCX, and the like and vector data NVEC1, vector data NVEC2, the vector data NVECX, and the like that are obtained by vector conversion of the documents are stored in the secondary database 42.

In processing T12 indicated by an arrow in FIG. 3, the component 20 has a function of receiving the question sentence QRE transferred from the component 10.

In processing T13 indicated by an arrow in FIG. 3, the component 20 has a function of converting the query QRE transferred from the component 10 into vector data (vector data VECY shown in FIG. 1) and performing a similarity search in the secondary database 42. In FIG. 3, the vector data NVEC1, the vector data NVEC2, vector data NVECZ (Z is an integer greater than or equal to 3), and the like linked to the document NDOC1, the document NDOC2, a document NDOCZ, and the like, respectively, are stored in the secondary database 42, and a state where a similarity evaluation between the pieces of vector data (each of the pieces of the vector data NVEC1, the vector data NVEC2, the vector data NVECZ, and the like) and the vector data VECY is performed is indicated by dashed arrows.

In processing T14 indicated by an arrow in FIG. 3, the component 20 has a function of extracting the document that has been determined to have a high degree of similarity by the above similarity search (the document NDOCZ shown in FIG. 1) from the secondary database 42 and receiving the document. In FIG. 3, a state where the document NDOCZ linked to the vector data NVECZ having a high degree of similarity to the vector data VECY is extracted is indicated by a dashed arrow. The vector data NVECZ can be vector data that is most similar to the vector data VECY by the above similarity search, for example.

Although FIG. 3 illustrates an example in which one piece of the vector data (the vector data NVECZ) is determined to have a high degree of similarity by the above similarity search, one embodiment of the present invention is not limited thereto. For example, documents linked to the top ten pieces of vector data that are determined to have high degrees of similarity by the above similarity search can be extracted. The number of pieces of vector data that is determined to have a high degree of similarity can be set freely by the user.

Alternatively, in the case where the cosine similarity is used as an indicator representing the degree of similarity in the above similarity search, for example, the degree of similarity can be regarded as high when the cosine similarity is greater than or equal to 0.8, and documents linked to the pieces of vector data having high degrees of similarity can be extracted. A cosine similarity value regarded as having a high degree of similarity can be set freely by the user.

In processing T15 indicated by an arrow in FIG. 3, the component 20 has a function of creating a prompt PT3 on the basis of the document NDOCZ and the question sentence QRE and a function of transferring the prompt PT3 to the component 30. For example, the component 20 creates a sentence written in a natural language such as "Create an answer sentence to the question sentence QRE on the basis of the description in the document NDOCZ" as the prompt PT3 and transfers the prompt PT3 to the component 30.

In processing T16 indicated by an arrow in FIG. 3, the component 20 has a function of receiving the answer sentence ANS newly generated by the component 30 on the basis of the prompt PT3.

In the processing T17 indicated by an arrow in FIG. 3, the component 20 has a function of transferring, to the component 10, the answer sentence ANS transferred from the component 30.

The component 20 has a function of performing processing using a search engine. The search engine has a function of obtaining a necessary search result from the data source 40, the primary database 41, or the secondary database 42 on the basis of the information IN1, the information IN2, the question sentence QRE, or the like transferred from the component 10. Thus, as described above, it is possible to search the data source 40 for information related to the information IN1 in accordance with the information IN1 and IN2 transferred from the component 10.

For example, an external search service that provides website information on the Internet can be used as the search engine. Archived official documents or archived private documents can be used as the data source 40. In addition, a database that manages confidential information or the like in an organization to which the user belongs can be used as the data source 40.

The component 20 has a function of converting the pieces of text data (e.g., the chapter CPTX and the document NDOCX) into the pieces of vector data (e.g., the vector data VECX and the vector data NVECX) to calculate the degree of similarity. For example, the pieces of text data can be converted into the pieces of vector data with use of the large language model. Specifically, the pieces of text data can be converted into the pieces of vector data using BERT, GPT-3, GPT-3.5, GPT-4, LaMDA, PaLM, Llama2, ALBERT, XLNet, or the like.

Thus, a similarity search in the primary database 41 can be performed in accordance with the chapter CPTX (more specifically, the vector data VECX obtained by vector conversion of the chapter CPTX) included in the list CPLST transferred from the component 30. In addition, a similarity search in the secondary database 42 can be performed in accordance with the document NDOCX (more specifically, the vector data NVECX obtained by vector conversion of the document NDOCX) transferred from the component 30.

The primary database 41 and the secondary database 42 are each a database formed using the information stored in the data source 40 on the basis of the information IN1 and IN2 input by the user. Thus, databases dedicated to information that the user needs can be built as the primary database 41 and the secondary database 42 from the data source 40 storing a variety of information. In this manner, the answer accuracy to the user's question of the information processing system can be improved.

<<Structure Example of Component 30>>

As the component 30, a large computer such as a server computer or a supercomputer can be used, for example. Note that the component 30 has a larger scale and higher computational capability than the component 20.

The component 30 preferably has a function of a parallel computer. By using the component 30 as a parallel computer, large-scale computation necessary for AI learning and inference can be performed, for example.

The component 30 can perform processing using a natural language processing model using AI. In particular, the component 30 can execute processing using a general-purpose language processing model capable of performing various natural language processing tasks.

For example, it is possible to execute processing using a natural language model such as BERT, T5, GPT-3, GPT-3.5, GPT-4, LaMDA, PaLM, Llama2, ALBERT, or XLNet. It is particularly preferable that processing using GPT-4 be executed. Thus, text generation, interaction, or the like that is more natural can be achieved.

Note that a provider that provides service with the use of the information processing system of one embodiment of the present invention does not necessarily have to own the component 30. For example, the service provider can use part of the service which another company or the like provides as the component 30.

In the processing T2 indicated by an arrow in FIG. 2, the component 30 has a function of receiving the prompt PT1 transferred from the component 20.

The component 30 has a function of generating the list CPLST on the basis of the prompt PT1 and transferring the list CPLST to the component 20 in the processing T3 indicated by an arrow in FIG. 2.

In the processing T9 indicated by an arrow in FIG. 2, the component 30 has a function of receiving the prompt PT2 transferred from the component 20.

The component 30 has a function of generating the document NDOCX on the basis of the prompt PT2 and transferring the document NDOCX to the component 20 in the processing T10 indicated by an arrow in FIG. 2.

In the processing T15 indicated by an arrow in FIG. 3, the component 30 has a function of receiving the prompt PT3 transferred from the component 20.

The component 30 has a function of generating the answer sentence ANS on the basis of the prompt PT3 and transferring the answer sentence ANS to the component 20 in the processing T16 indicated by an arrow in FIG. 3.

The component 30 has a function of performing processing with use of a large language model (which is different from the large language model that can be included in the component 20). Note that the large language model has learned a data set. Thus, the list CPLST can be automatically generated on the basis of the prompt PT1 transferred from the component 20 as described above. Furthermore, the document NDOCX can be automatically generated on the basis of the prompt PT2 transferred from the component 20. Moreover, the answer sentence ANS can be automatically generated on the basis of the prompt PT3 transferred from the component 20.

For example, the component 30 can generate the list CPLST, which includes the three chapters (the text data of names) of "overview of AXEL", "AXEL standard operation function", and "AXEL GUI operation function", on the basis of the prompt PT1 including the information IN1 "AXEL function" transferred from the component 20. In addition, the component 30 can generate the document NDOCX, which is a new explanatory sentence dedicated to "overview of AXEL", on the basis of the prompt PT2 including the chapter CPTX "overview of AXEL" transferred from the component 20 and the document DOCB, which is text data related to the keyword "AXEL function", extracted from the primary database 41. That is, in the case where the list CPLST includes the above three chapters, the component 30 can create a document including an explanatory sentence related to "overview of AXEL", an explanatory sentence related to "AXEL standard operation function", and an explanatory sentence related to "AXEL GUI operation function".

With the information processing system of one embodiment of the present invention having a variety of functions described above, a highly accurate answer can be generated regardless of the user's question content. Moreover, the user only supplies the first information (the user's purpose, subject, or the like), the second information (the place where desired data such as the database or the data folder is stored), and the question sentence QRE to make the information processing system automatically generate an answer by the retrieval augmented generation method; thus, the workload of the user is extremely small. As a result, a novel information processing system that is highly convenient, useful, or reliable can be provided.

The information processing system of one embodiment of the present invention includes an information processing device having the functions of the above-described components.

For example, the information processing system of one embodiment of the present invention can be composed of an information processing device having the functions of the component 10, an information processing device having the functions of the component 20, and an information processing device having the functions of the component 30. Note that the number of information processing devices constituting the information processing system of one embodiment of the present invention is one or more. As another example, the information processing system of one embodiment of the present invention can be composed of a plurality of information processing devices that are connected to each other via the network 50.

When the information processing system of one embodiment of the present invention is composed of a plurality of information processing devices, loads related to information processing can be split.

Details of a structure example of an information processing device that can be used for the information processing system of one embodiment of the present invention will be described below.

<<Structure Example of Information Processing Device>>

Figure 4:
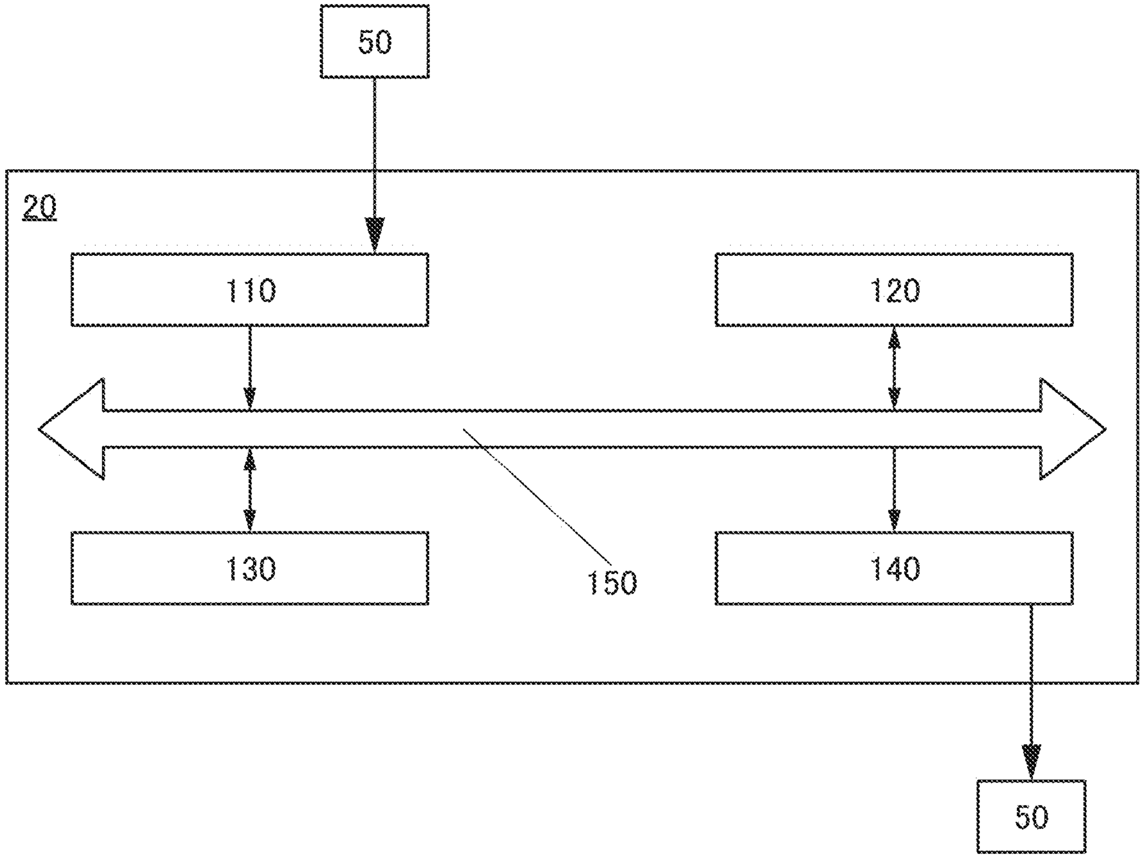
FIG. 4 is a block diagram illustrating a structure of an information processing device used for an information processing system.

The information processing device that can be used for the information processing system of one embodiment of the present invention includes, for example, an input unit 110, a memory unit 120, a processing unit 130, an output unit 140, and a transmission path 150 (see FIG. 4).

Although the block diagram in drawings attached to this specification illustrates constituent elements classified by their functions in independent blocks, it is difficult to classify actual constituent elements completely on the basis of their functions, and one constituent element can have a plurality of functions. For example, part of the processing unit 130 may function as the input unit 110. In addition, one function can be involved in a plurality of constituent elements. For example, processing executed by the processing unit 130 may be executed in different servers depending on processing content.

[Input Unit 110]

The input unit 110 can receive data from the outside of the information processing device. For example, the input unit 110 receives data via the network 50.

The input unit 110 supplies the received data to one or both of the memory unit 120 and the processing unit 130 via the transmission path 150.

[Memory Unit 120]

The memory unit 120 has a function of holding a program to be executed by the processing unit 130. The memory unit 120 can have a function of holding data (e.g., an arithmetic result, an analysis result, and an inference result) generated by the processing unit 130, data received by the input unit 110, and the like.

The memory unit 120 can include a database. The information processing device can include a database different from that of the memory unit 120. The information processing device can have a function of extracting data from a database that is placed outside the memory unit 120, the information processing device, or the information processing system. The information processing device can have a function of extracting data from both of its own database and an external database.

One or both of a storage and a file server can be used as the memory unit 120. In addition, a database in which a path of a file stored in the file server is recorded can be used as the memory unit 120.

The memory unit 120 includes at least one of a volatile memory and a nonvolatile memory. Examples of the volatile memory include a dynamic random access memory (DRAM) and a static random access memory (SRAM). Examples of the nonvolatile memory include a resistive random access memory (ReRAM, also referred to as a resistance-change memory), a phase-change random access memory (PRAM), a ferroelectric random access memory (FeRAM), a magnetoresistive random access memory (MRAM, also referred to as a magnetoresistive memory), and a flash memory. The memory unit 120 can include at least one of a NOSRAM (registered trademark) and a DOSRAM (registered trademark). The memory unit 120 can include a recording media drive. Examples of the recording media drive include a hard disk drive (HDD) and a solid state drive (SSD).

Note that "NOSRAM" is an abbreviation for "nonvolatile oxide semiconductor random access memory (RAM)". The NOSRAM refers to a memory in which a two-transistor (2T) or three-transistor (3T) gain cell is used as a memory cell and each transistor includes a metal oxide in its channel formation region (such a transistor is also referred to as an OS transistor). The OS transistor has an extremely low current that flows between a source and a drain in an off state, that is, an extremely low leakage current. The NOSRAM can be used as a nonvolatile memory by retaining electric charge corresponding to data in memory cells with the use of the characteristic of extremely low leakage current. In particular, the NOSRAM is capable of reading retained data without destruction (non-destructive reading), and thus is suitable for arithmetic processing in which only data reading operations are repeated many times. The NOSRAM can have large data capacity when being stacked in layers; accordingly, when the NOSRAM is used in a large-scale cache memory, a large-scale main memory, or a large-scale storage memory, the performance of the semiconductor device can be improved.

The DOSRAM is an abbreviation for "dynamic oxide semiconductor RAM" and refers to a RAM including a one-transistor (1T) and one-capacitor (1C) memory cell. The DOSRAM is a DRAM formed using an OS transistor and temporarily stores information sent from the outside. The DOSRAM is a memory utilizing low off-state current of an OS transistor.

In this specification and the like, a metal oxide means an oxide of a metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases.

The metal oxide included in the channel formation region preferably includes indium (In). When the metal oxide included in the channel formation region is a metal oxide including indium, the carrier mobility (electron mobility) of the OS transistor is high. The metal oxide included in the channel formation region is preferably an oxide semiconductor including an element M. The element M is preferably at least one of aluminum (Al), gallium (Ga), and tin (Sn). Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that a combination of two or more of the above elements may be used as the element M. The element M is, for example, an element that has high bonding energy with oxygen. The element M is, for example, an element that has higher bonding energy with oxygen than indium does. The metal oxide included in the channel formation region is preferably a metal oxide including zinc (Zn). The metal oxide including zinc is easily crystallized in some cases.

The metal oxide included in the channel formation region is not limited to the metal oxide including indium. The metal oxide in the channel formation region may be, for example, a metal oxide that does not include indium and includes any of zinc, gallium, and tin (e.g., zinc tin oxide or gallium tin oxide).

[Processing Unit 130]

The processing unit 130 has a function of performing processing such as arithmetic operation, analysis, and inference with the use of data supplied from one or both of the input unit 110 and the memory unit 120. The processing unit 130 can supply generated data (e.g., an arithmetic result, an analysis result, or an inference result) to one or both of the memory unit 120 and the output unit 140.

The processing unit 130 has a function of obtaining data from the memory unit 120. The processing unit 130 can have a function of storing or registering data in the memory unit 120.

The processing unit 130 can include, for example, an arithmetic circuit. The processing unit 130 can include, for example, a central processing unit (CPU). The processing unit 130 can also include a graphics processing unit (GPU).

The processing unit 130 can include a microprocessor such as a digital signal processor (DSP). The microprocessor can be achieved with a programmable logic device (PLD) such as a field programmable gate array (FPGA) or a field programmable analog array (FPAA). The processing unit 130 can include a quantum processor. With a processor, the processing unit 130 can interpret and execute instructions from various kinds of programs to process various kinds of data and control programs. The programs to be executed by the processor are stored in at least one of the memory unit 120 and a memory region of the processor.

The processing unit 130 can include a main memory. The main memory includes at least one of a volatile memory such as a RAM and a nonvolatile memory such as a read only memory (ROM). The main memory can include at least one of the above-described NOSRAM and DOSRAM.

For example, a DRAM, an SRAM, or the like is used as the RAM, and a virtual memory space is assigned and utilized as a working space of the processing unit 130. An operating system, an application program, a program module, program data, a look-up table, and the like that are stored in the memory unit 120 are loaded into the RAM for execution. The data, program, and program module that are loaded into the RAM are each directly accessed and operated by the processing unit 130.

The ROM can store a basic input/output system (BIOS), firmware, and the like for which rewriting is not needed. Examples of the ROM include a mask ROM, a one-time programmable read only memory (OTPROM), and an erasable programmable read only memory (EPROM). Examples of the EPROM include an ultraviolet erasable programmable read only memory (UV-EPROM) that can erase held data by irradiation with ultraviolet rays, an electrically erasable programmable read only memory (EEPROM), and a flash memory.

The processing unit 130 can include one or both of an OS transistor and a transistor including silicon in its channel formation region (a Si transistor).

The processing unit 130 preferably includes an OS transistor. Since the OS transistor has an extremely low off-state current, a long data retention period can be ensured with the use of the OS transistor as a switch for retaining electric charge (data) that has flowed into a capacitor functioning as a memory element. When this feature is imparted to at least one of a register and a cache memory included in the processing unit, the processing unit can be operated only when needed, and otherwise can be off while information processed immediately before turning off the processing unit is stored in the memory element. In other words, normally-off computing is possible, and power consumption of the information processing system can be reduced.

The information processing device preferably uses AI for at least part of its processing.

In particular, the information processing device preferably uses an artificial neural network (ANN; hereinafter also simply referred to as a neural network). The neural network is constructed with circuits (hardware) or programs (software).

In this specification and the like, the neural network indicates a general model having the capability of solving problems, which is modeled on a biological neural network and determines the connection strength of neurons (also referred to as weight coefficients) by learning. The neural network includes an input layer, a middle layer (hidden layer), and an output layer.

In the description of the neural network in this specification and the like, determining a connection strength of neurons from the existing information is referred to as "learning" in some cases.

In this specification and the like, drawing a new conclusion from a neural network formed with the connection strength obtained by learning is referred to as "inference" in some cases.

[Output Unit 140]

The output unit 140 can output at least one of an arithmetic result, an analysis result, and an inference result in the processing unit 130 to the outside of the information processing device. For example, the output unit 140 can transmit data via the network 50.

[Transmission Path 150]

The transmission path 150 has a function of transmitting data. Data transmission and reception between the input unit 110, the memory unit 120, the processing unit 130, and the output unit 140 can be performed via the transmission path 150.

<<Structure Example of Network 50>>

The network 50 that can be used for the information processing system of one embodiment of the present invention can connect a plurality of information processing devices. Thus, the plurality of information processing devices connected to each other can transmit and receive data to/from each other. Furthermore, loads related to information processing can be split.

Note that for wireless communication, it is possible to use, as a communication protocol or a communication technology, a communication standard such as the fourth-generation mobile communication system (4G), the fifth-generation mobile communication system (5G), or the sixth-generation mobile communication system (6G), or a communication standard developed by IEEE, such as Wi-Fi (registered trademark) or Bluetooth (registered trademark).

For example, a local network can be used as the network 50. An intranet or an extranet can also be used as the network 50. For another example, a personal area network (PAN), a local area network (LAN), a campus area network (CAN), a metropolitan area network (MAN), a wide area network (WAN), or a global area network (GAN) can be used as the network 50.

For another example, a global network can be used as the network 50. Specifically, the Internet, which is an infrastructure of the World Wide Web (WWW), can be used.

The provider that provides service with the use of the information processing system of one embodiment of the present invention can provide service using the information processing method of one embodiment of the present invention via the network 50, for example.

Note that when the information processing system of one embodiment of the present invention is built in a local network, the possibility of leaking confidential data can be lower than that in the case of using the Internet, for example.

This embodiment can be combined with the other embodiment in this specification as appropriate.

Embodiment 2

In this embodiment, an information processing method of one embodiment of the present invention will be described with reference to FIG. 5 to FIG. 12B.

FIG. 5 to FIG. 8 and FIG. 10 and FIG. 11 are flowcharts showing information processing methods of one embodiment of the present invention. FIGS. 9A to 9C and FIGS. 12A and 12B illustrate structure examples of documents generated by the information processing method of one embodiment of the present invention.

Note that for reference numerals used in the following description that are the same as those used in Embodiment 1, the description in Embodiment 1 can be applied to. Thus, detailed description of the meaning, definition, and the like of a constituent element denoted by such a reference numeral is omitted below in some cases.

Example 1 of Information Processing Method

The information processing method of one embodiment of the present invention includes Steps S1 to S23 (see FIG. 5 to FIG. 8).

[Step S1]

In Step S1 (see FIG. 5), the user inputs the name of an automatic conversational program (chatbot) to be used to the component 10. The chatbot has a function of the information processing system of one embodiment of the present invention. Accordingly, the user can hereinafter utilize the function of the above-described information processing system by following a predetermined procedure.

[Step S2]

In Step S2 (see FIG. 5), the user inputs the information IN1 and IN2 to the component 10. The component 10 receives the information IN1 and IN2 input by the user and then transfers the information IN1 and IN2 to the component 20.

[Step S3]

The component 20 receives the information IN1 and IN2 transferred from the component 10, then in Step S3 (see FIG. 5), creates the prompt PT1 on the basis of the information IN1 and transfers the prompt PT1 to the component 30.

[Step S4]

In Step S4 (see FIG. 5), the component 30 generates the list CPLST on the basis of the prompt PT1.

[Step S5]

In Step S5 (see FIG. 5), the component 20 searches the data storage (specifically, the data source 40) specified by the information IN2 for data related to the information IN1.

[Step S6]

In Step S6 (see FIG. 5), the component 20 detects the data (e.g., the information INFA) related to the information IN1 and extracts only the text components (e.g., the document DOCA) from the data.

[Step S7]

In Step S7 (see FIG. 5), the component 20 obtains the list CPLST generated by the component 30 in Step S4.

Figure 5:
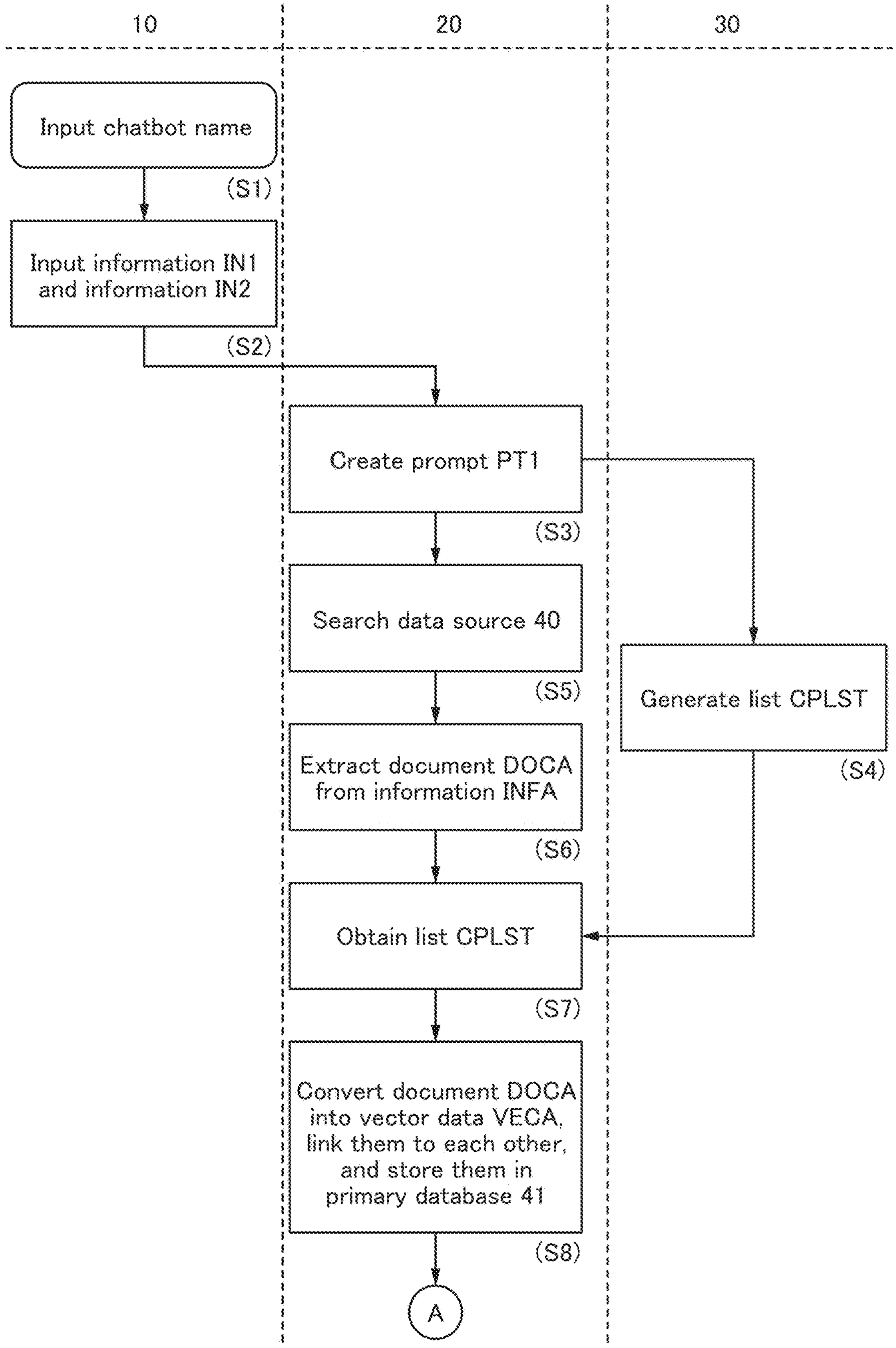
FIG. 5 is a flow chart showing an information processing method.
Figure 6:
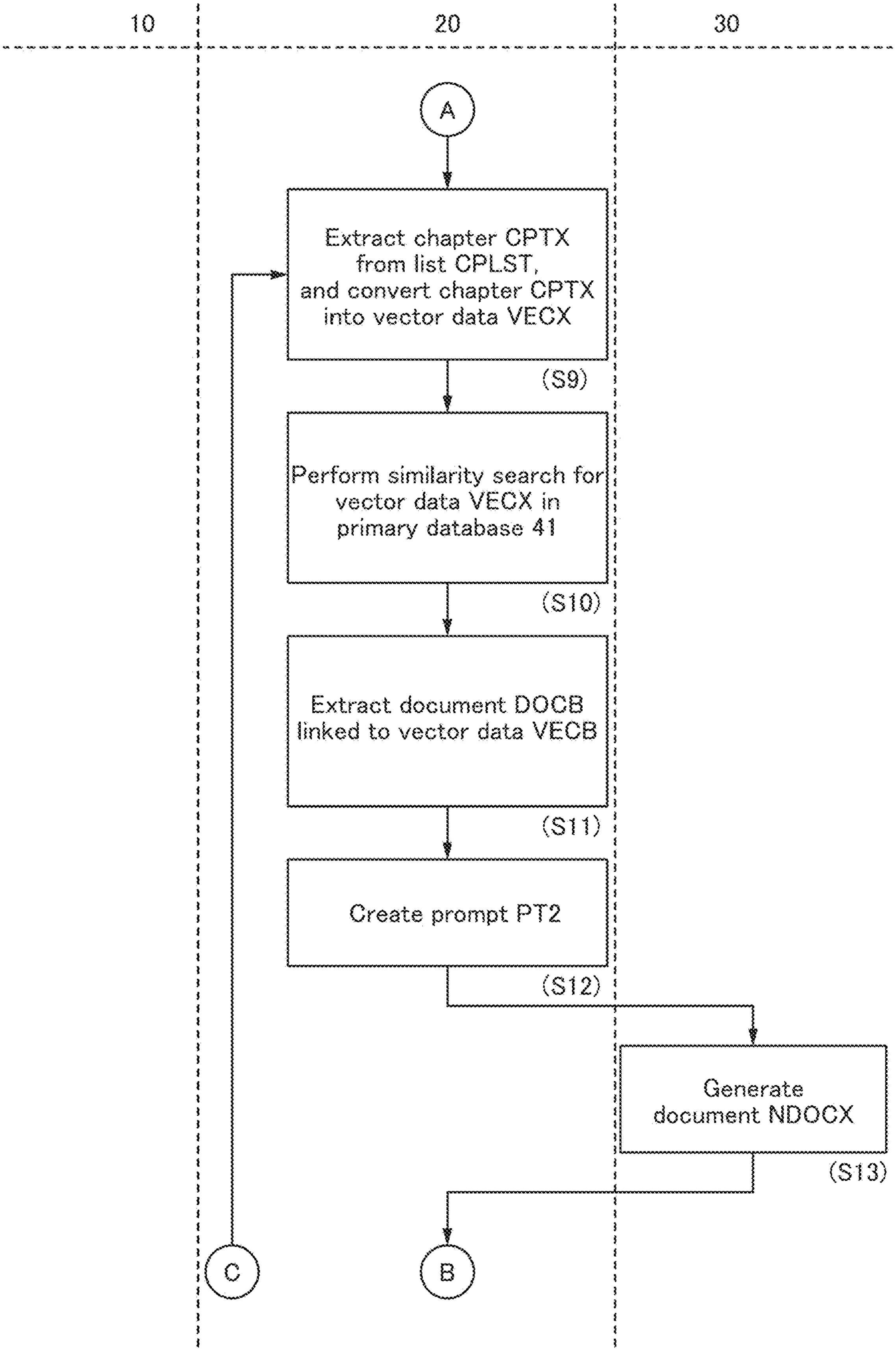
FIG. 6 is a flow chart showing an information processing method.

Although FIG. 5 shows an example in which the processing in Step S4 and the processing in Steps S5 and S6 are performed in parallel, one embodiment of the present invention is not limited thereto. For example, the processing in Steps S5 and S6 can be performed after performing the processing in Step S4. For another example, the processing in Step S4 can be performed after performing the processing in Steps S5 and S6.

[Step S8]

In Step S8 (see FIG. 5), the component 20 converts the text data (the document DOCA) extracted in Step S6 into the vector data (e.g., the vector data VECA), then links the document DOCA and the vector data VECA to each other, and stores them in the primary database 41.

[Step S9]

In Step S9 (see FIG. 6), the component 20 extracts only one chapter (e.g., the chapter CPTX) from the list CPLST obtained in Step S7 and converts the chapter into vector data (e.g., vector data VECX).

[Step S10]

In Step S10 (see FIG. 6), the component 20 performs a similarity search for the vector data VECX in the primary database 41.

[Step S11]

In Step S11 (see FIG. 6), the component 20 detects the vector data (e.g., the vector data VECB) that is most similar to the vector data VECX in the primary database 41, extracts the text data (e.g., the document DOCB) linked to the vector data, and then receives the text data.

[Step S12]

In Step S12 (see FIG. 6), the component 20 creates the prompt PT2 on the basis of the chapter CPTX extracted in Step S9 and the document DOCB extracted in Step S11, and transfers the prompt PT2 to the component 30.

[Step S13]

In Step S13 (see FIG. 6), the component 30 generates new text data (e.g., the document NDOCX) on the basis of the prompt PT2 received from the component 20.

[Step S14]

In Step S14 (see FIG. 7), the component 20 obtains the document NDOCX generated by the component 30 in Step S13.

[Step S15]

In Step S15 (see FIG. 7), the component 20 determines whether there is a chapter other than the chapter CPTX included in the list CPLST.

In the case where the determination result is "Yes" in Step S15, the component 20 returns to Step S9 and extracts only one chapter other than the chapter CPTX (i.e., a chapter that has not undergone processing in Steps S9 to S14) from the list CPLST. After that, the processing in Steps S9 to S14 is performed on the chapter (see FIG. 6 and FIG. 7).

Figure 9A:
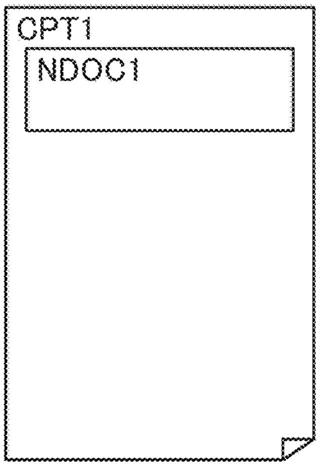
FIGS. 9A to 9C are diagrams each illustrating a structure of a document generated by an information processing system.
Figure 9B:
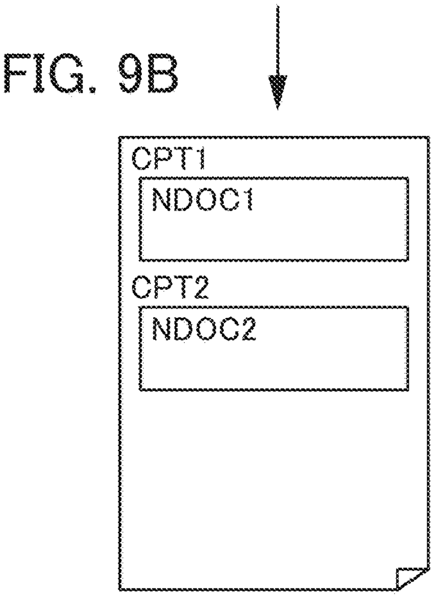

Note that in the case where the list CPLST includes a plurality of chapters (e.g., a chapter CPT1 to the chapter CPTX), the processing in Steps S9 to S14 is performed on the chapter (e.g., the chapter CPT1) extracted from the list CPLST at the start of Step S9, and a text file in which the chapter CPT1 and the document NDOC1 are written is generated (see FIG. 9A).

Next, in Step S9, a chapter other than the chapter CPT1 (e.g., the chapter CPT2) is extracted from the list CPLST, and the processing in Steps S9 to S14 is performed on the chapter. Accordingly, the chapter CPT2 and the document NDOC2 are added to the text file illustrated in FIG. 9A (see FIG. 9B).

Figure 9C:
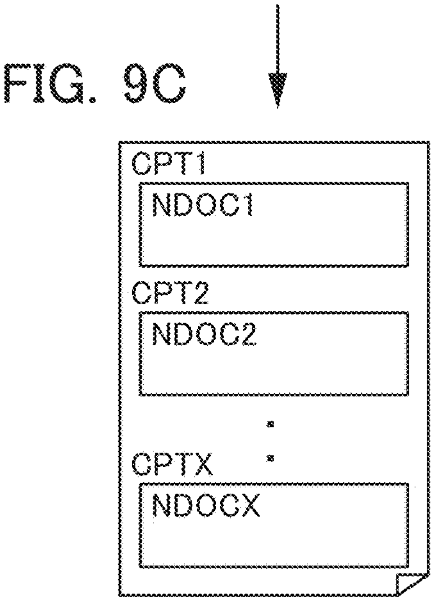
Figure 10:
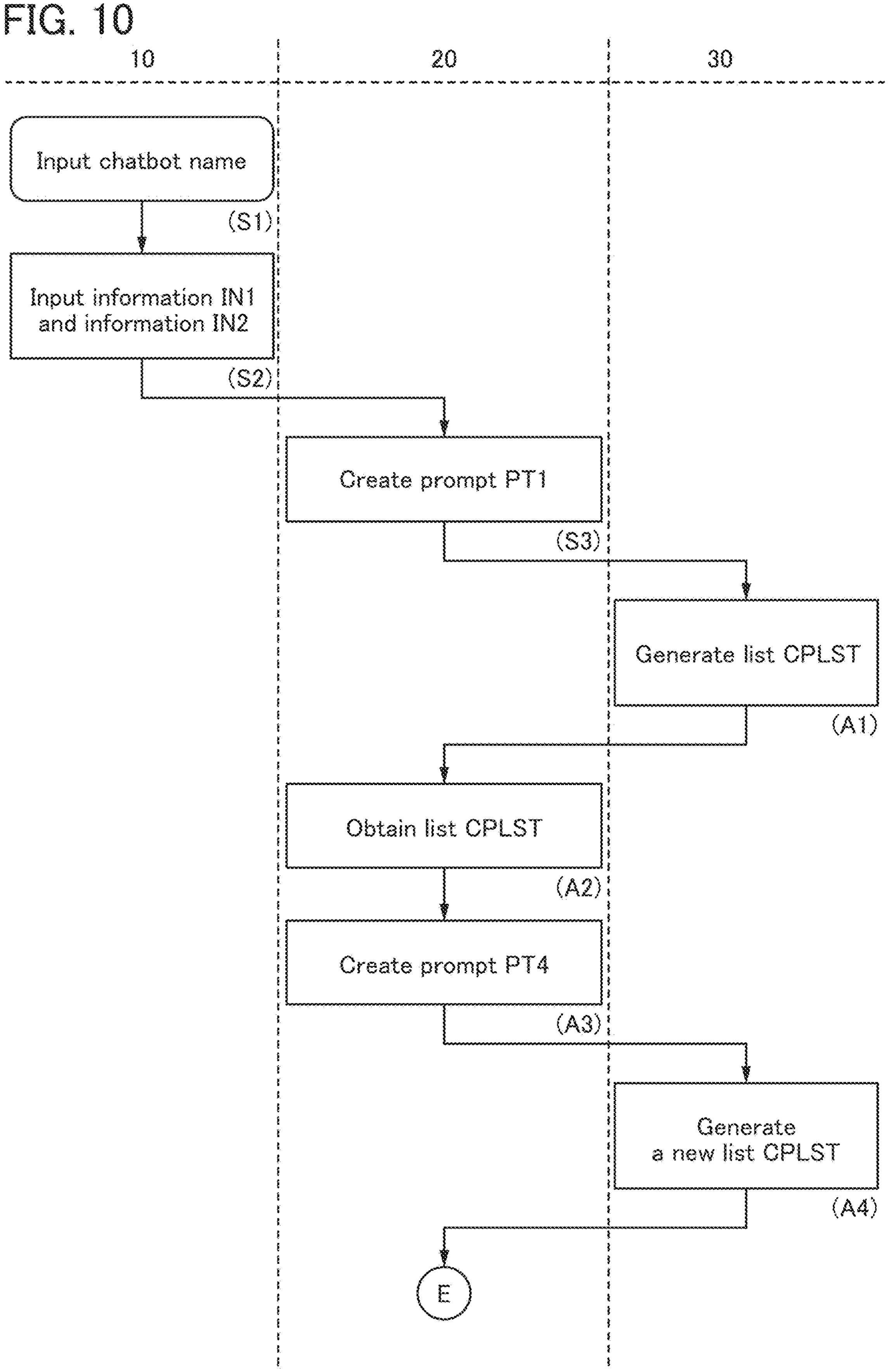
FIG. 10 is a flow chart showing an information processing method.
Figure 11:
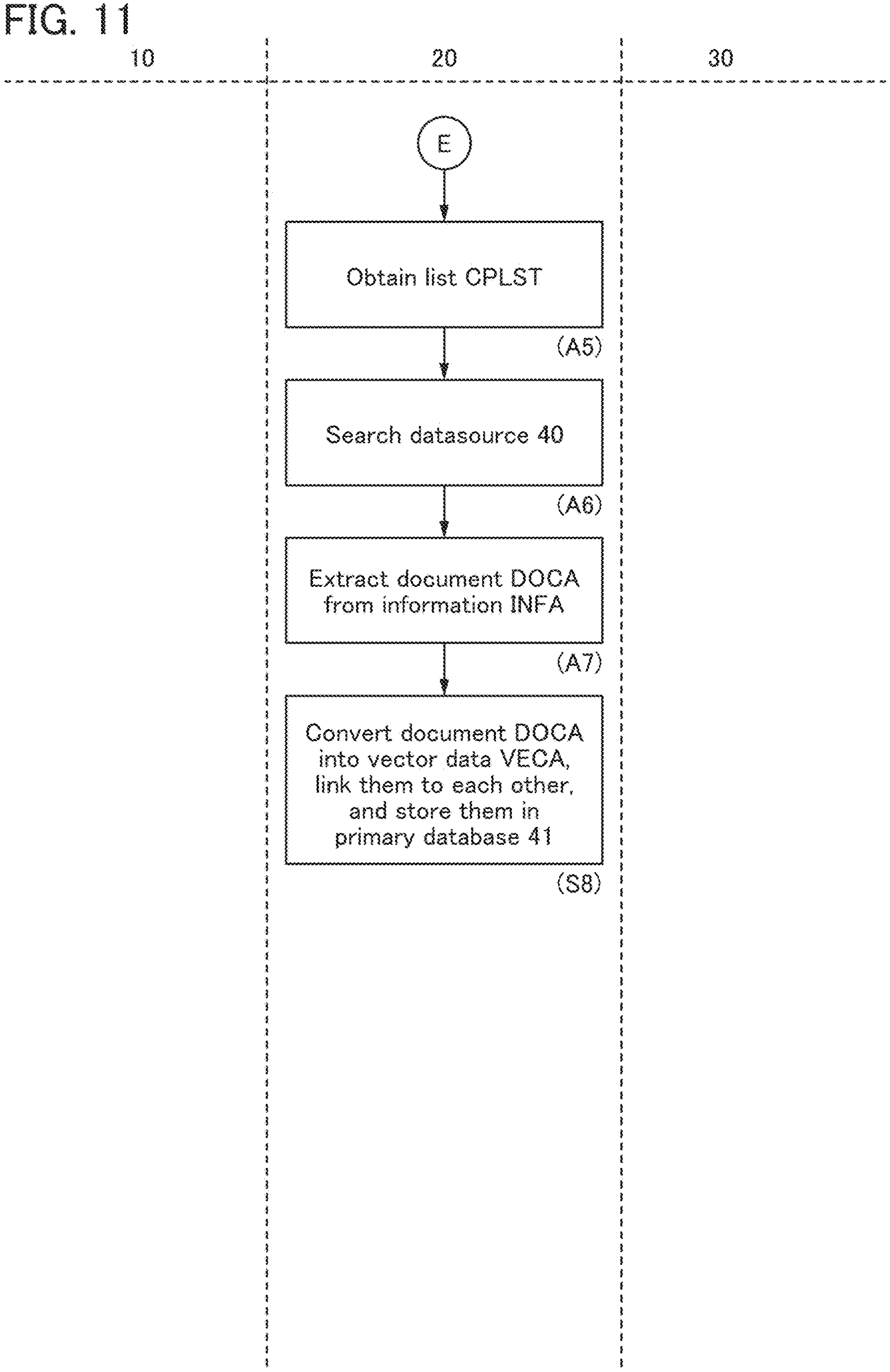
FIG. 11 is a flow chart showing an information processing method.

The above processing repeated in accordance with the number (X) of chapters included in the list CPLST in this manner ultimately can generate a text file in which the chapter CPT1 to the chapter CPTX and the document NDOC1 to the document NDOCX that correspond to the chapters, respectively, are written (see FIG. 9C).

[Step S16]

Figure 7:
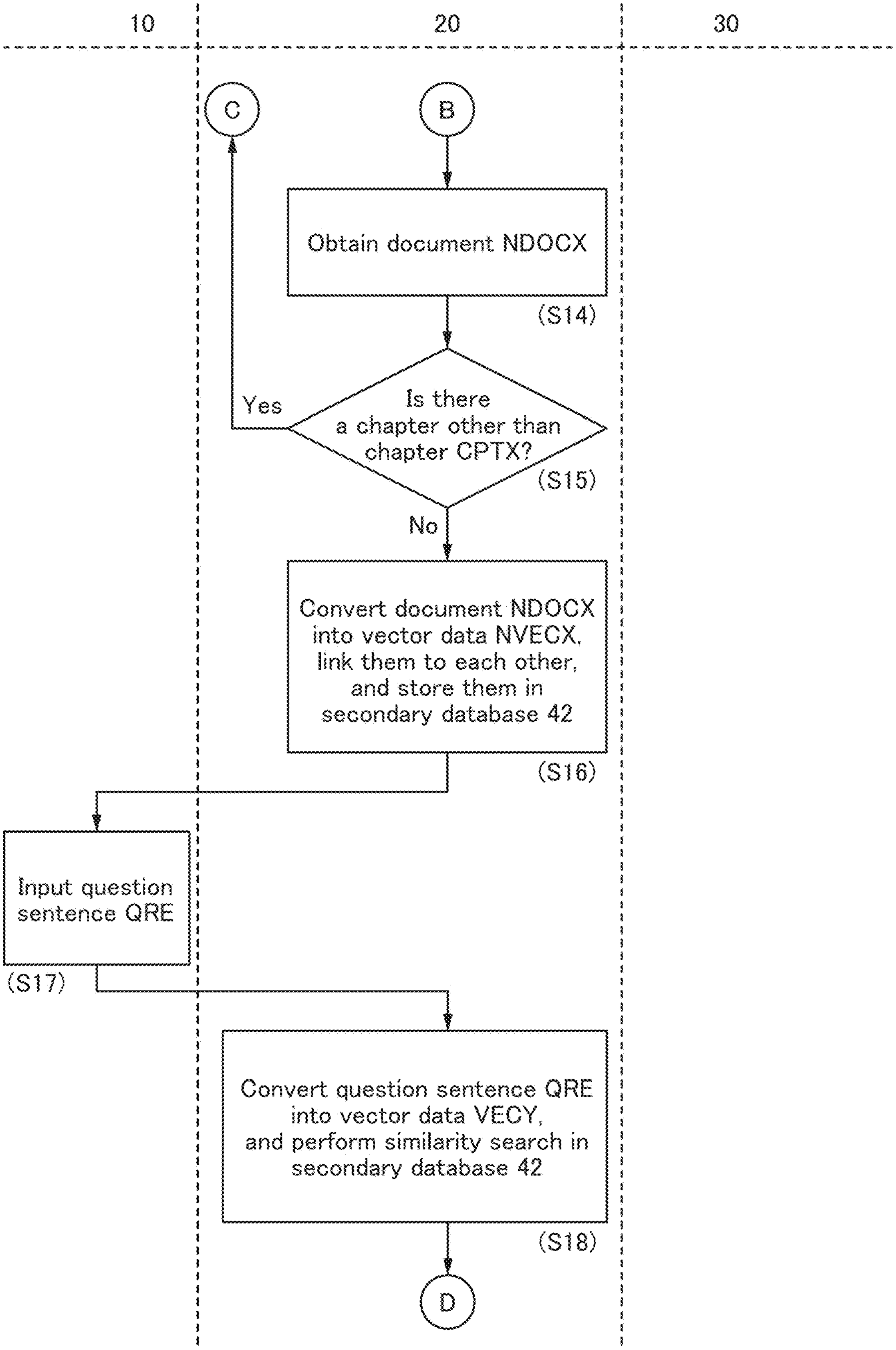
FIG. 7 is a flow chart showing an information processing method.
Figure 8:
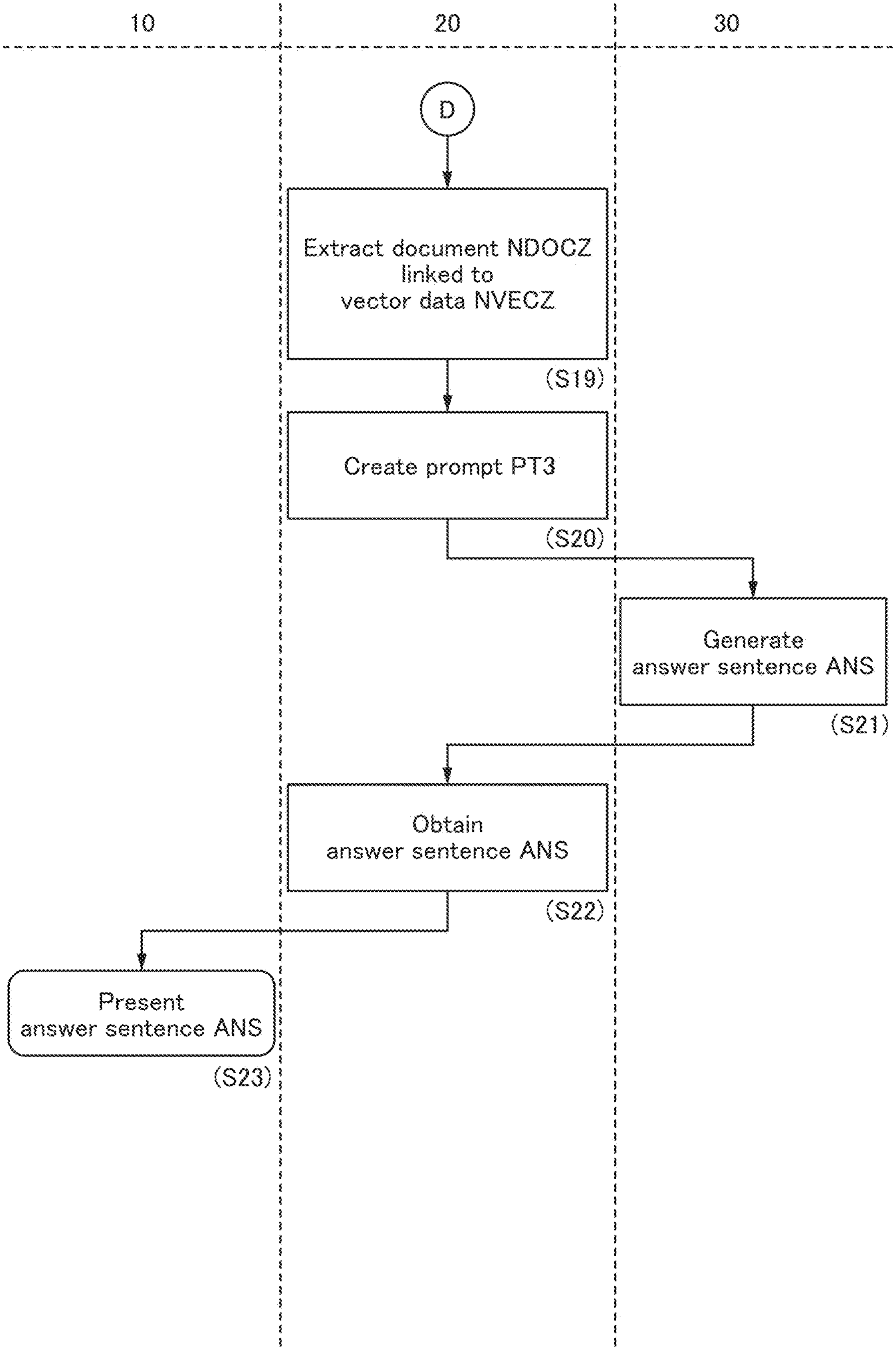
FIG. 8 is a flow chart showing an information processing method.

In the case where the determination result is "No" in Step S15, the component 20 converts the text data (e.g., the document NDOCX in the case where only the document NDOCX is written in the text file) included in the text file (see FIGS. 9A to 9C) into the vector data (e.g., the vector data NVECX), then links the text data and the vector data to each other, and stores them in the secondary database 42 in Step S16 (see FIG. 7).

[Step S17]

In Step S17 (see FIG. 7), the user inputs the question sentence QRE to the component 10. After receiving the question sentence QRE, the component 10 transfers the question sentence QRE to the component 20.

[Step S18]

The component 20 receives the question sentence QRE transferred from the component 10, then in Step S18 (see FIG. 7), converts the question sentence QRE into the vector data (e.g., the vector data VECY), and performs a similarity search for the vector data VECY in the secondary database 42.

[Step S19]

In Step S19 (see FIG. 8), the component 20 detects the vector data (e.g., the vector data NVECZ) that is most similar to the vector data VECY in the secondary database 42, extracts the text data (e.g., the document NDOCZ) linked to the vector data, and then receives the text data.

[Step S20]

In Step S20 (see FIG. 8), the component 20 creates the prompt PT3 on the basis of the question sentence QRE received in Step S18 and the document NDOCZ extracted in Step S19, and transfers the prompt PT3 to the component 30.

[Step S21]

In Step S21 (see FIG. 8), the component 30 generates the answer sentence ANS on the basis of the prompt PT3 received from the component 20 and then transfers the answer sentence ANS to the component 20.

[Step S22]

In Step S22 (see FIG. 8), the component 20 obtains the answer sentence ANS transferred from the component 30 and then transfers the answer sentence ANS to the component 10.

[Step S23]

In Step S23 (see FIG. 8), the component 10 receives the answer sentence ANS transferred from the component 20 and then presents the answer sentence ANS to the user.

Through the above-described series of processing, the user can check the answer sentence ANS to the question sentence QRE via the component 10.

Example 2 of Information Processing Method

An example of an information processing method that is partly different from the description of <Example 1 of information processing method> will be described below with reference to FIG. 10, FIG. 11, and FIGS. 12A and 12B.

The description of <Example 1 of information processing method> can be referred to for the processing in Steps S1 to S3.

[Step A1]

In Step A1 (see FIG. 10), the component 30 generates the list of chapters (e.g., the list CPLST) on the basis of the prompt PT1. The processing in this step corresponds to the processing in Step S4 (see FIG. 5) described in <Example 1 of information processing method>.

[Step A2]

In Step A2 (see FIG. 10), the component 20 obtains the list CPLST generated by the component 30 in Step A1.

[Step A3]

In Step A3 (see FIG. 10), the component 20 creates a prompt PT4 on the basis of the list CPLST and transfers the prompt PT4 to the component 30. For example, a sentence written in a natural language such as "Create a new list CPLST by further dividing the chapters included in the list CPLST into sections or items" is created by the component 20 as the prompt PT4.

[Step A4]

In Step A4 (see FIG. 10), the component 30 generates a new list CPLST in which the chapter (e.g., the chapter CPT1) included in the original list CPLST is divided into sections (e.g., a section SEC1-1 and the like (see FIGS. 12A and 12B)) on the basis of the prompt PT4.

[Step A5]

In Step A5 (see FIG. 11), the component 20 obtains a new list CPLST generated by the component 30 in Step A4.

[Step A6]

In Step A6 (see FIG. 11), the component 20 searches the data storage (specifically, the data source 40) specified by the information IN2 for data related to the information IN1. The processing in this step corresponds to the processing in Step S5 (see FIG. 5) described in <Example 1 of information processing method>.

[Step A7]

In Step A7 (see FIG. 11), the component 20 detects the data (e.g., the information INFA) related to the information IN1 and extracts only the text components (e.g., the document DOCA) from the data. The processing in this step corresponds to the processing in Step S6 (see FIG. 5) described in <Example 1 of information processing method>.

For the subsequent processing, the processing in Steps S8 to S23 described in <Example 1 of information processing method> can be referred to.

Through the above-described processing in Steps A1 to A4, the list CPLST including contents different from those of the case where the processing in Step S4 in <Example 1 of information processing method> is performed can be generated. Specifically, in the case where the processing in Step S4 described in <Example 1 of information processing method> is performed, the list CPLST including only chapter information of the text data to be created is generated. By contrast, in the case where the processing in Steps A1 to A4 is performed, the list CPLST that includes not only the chapter information but also section information is generated.

Figure 12A:
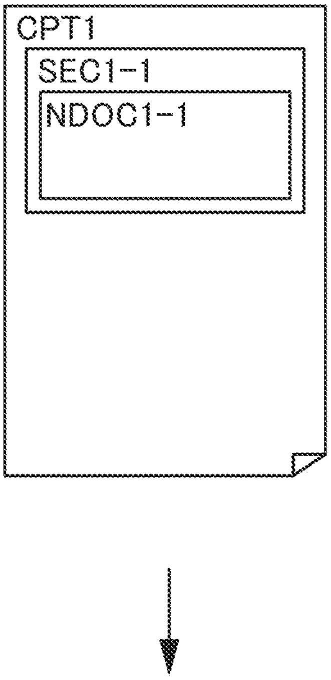
FIGS. 12A and 12B are diagrams each illustrating a structure of a document generated by an information processing system.

Thus, by performing the above-described processing in Steps A5 and A6 on the basis of the list CPLST including the section information, a text file in which a chapter, a section, and text data generated on the basis of the chapter and the section are written can be generated as illustrated in FIG. 12A. FIG. 12A illustrates an example of a text file in which the chapter CPT1, the section SEC1-1 included in the chapter CPT1, and the text data corresponding to the section SEC1-1 (a document NDOC1-1) are written.

Figure 12B:
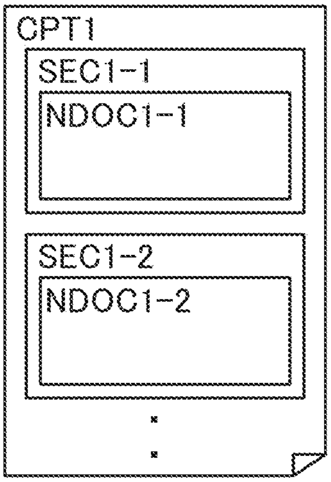

Note that in the case where the list CPLST includes a plurality of sections in one chapter, pieces of text data corresponding to each section can be generated. FIG. 12B illustrates an example of a text file in which the chapter CPT1 includes two or more sections (e.g., the section SEC1-1 and a section SEC1-2) and the pieces of text data (e.g., the document NDOC1-1 and a document NDOC1-2) corresponding to each section are written.

Note that by adding the processing in Steps A2 to A4 after Step A4, the list CPLST including items into which the sections are further divided can be generated, for example. Accordingly, a text file that is more divided than that in FIG. 12B can be generated.

With use of the above-described information processing method, the information processing system of one embodiment of the present invention can generate a highly accurate answer regardless of the user's question content. Moreover, the user only supplies the first information (the user's purpose, subject, or the like), the second information (the place where desired data such as the database or the data folder is stored), and the question sentence QRE to make the information processing system automatically create a chatbot that generates a highly accurate answer by the retrieval augmented generation method; thus, the workload of the user is extremely small. As a result, a novel information processing system that is highly convenient, useful, or reliable can be provided.

This embodiment can be combined with the other embodiment in this specification as appropriate.

This application is based on Japanese Patent Application Serial No. 2024-005544 filed with Japan Patent Office on Jan. 17, 2024, the entire contents of which are hereby incorporated by reference.

What is claimed is:

1. An information processing system comprising:

a processing unit configured to:

receive first information, second information, and a question sentence;

create a first prompt on the basis of the first information;

input the first prompt to a large language model and receive a list generated by the large language model, the list comprising a chapter;

extract a first document from inside a data source on the basis of the first information and the second information, the first document being a document related to the first information, and the data source being an information source specified by the second information;

store the first document in a first database;

search the first database and extract a second document on the basis of the chapter, the second document being a document related to the chapter;

create a second prompt on the basis of the chapter and the second document;

input the second prompt to the large language model and receive a third document generated by the large language model;

store the third document in a second database;

search the second database and extract a fourth document on the basis of the question sentence, the fourth document being a document related to the question sentence;

create a third prompt on the basis of the fourth document and the question sentence;

input the third prompt to the large language model and receive an answer sentence generated by the large language model; and output the answer sentence.

2. The information processing system according to claim 1, wherein the processing unit is configured to convert the first document into first vector data, link the first document and the first vector data to each other, and store the first document and the first vector data in the first database, convert the chapter into second vector data and perform a similarity search in the first database using the second vector data, convert the third document into third vector data, link the third document and the third vector data to each other, and store the third document and the third vector data in the second database, and convert the question sentence into fourth vector data and perform a similarity search in the second database using the fourth vector data.

3. An information processing method comprising:

a first step in which a first component receives first information and second information and then transfers the first information and the second information to a second component;

a second step in which the second component receives the first information and the second information, then creates a first prompt on the basis of the first information, and transfers the first prompt to a third component;

a third step in which the third component generates a list on the basis of the first prompt;

a fourth step in which the second component searches a data source for the first information on the basis of the second information, the data source being an information source specified by the second information;

a fifth step in which the second component extracts a first document comprising the first information;

a sixth step in which the second component receives the list;

a seventh step in which the second component converts the first document into first data, then links the first document and the first data to each other, and stores the first document and the first data in a first database, the list comprising a first chapter;

an eighth step in which the second component extracts the first chapter from the list and then converts the first chapter into second data;

a ninth step in which the second component searches the first database for the second data;

a tenth step in which the second component extracts a second document linked to third data from the first database, the third data being most similar to the second data;

an eleventh step in which the second component creates a second prompt on the basis of the first chapter and the second document and transfers the second prompt to the third component;

a twelfth step in which the third component generates a third document on the basis of the second prompt;

a thirteenth step in which the second component receives the third document from the third component;

a fourteenth step in which the second component determines whether the list comprises a second chapter; and a fifteenth step in which, in the case the second component determines that the list does not comprise the second chapter, the second component converts the third document into fourth data, then links the third document and the fourth data to each other, and stores the third document and the fourth data in a second database, the processing method further comprising a step in which, in the case where the second component determines that the list comprises the second chapter, the second component performs processing in the eighth to the thirteenth steps on the second chapter.

4. The information processing method according to claim 3, wherein the first data to the fourth data are vector data, and wherein in the ninth step, the search in the first database for the second data performed by the second component is a similarity search.

5. The information processing method according to claim 3, further comprising after the fifteenth step:

a sixteenth step in which the first component receives a question sentence and then transfers the question sentence to the second component;

a seventeenth step in which the second component converts the question sentence into fifth data and then searches the second database for the fifth data;

an eighteenth step in which the second component extracts a fourth document linked to sixth data from the second database, the sixth data being most similar to the fifth data;

a nineteenth step in which the second component creates a third prompt on the basis of the question sentence and the fourth document and transfers the third prompt to the third component;

a twentieth step in which the third component generates an answer sentence on the basis of the third prompt and then transfers the answer sentence to the second component;

a twenty-first step in which the second component receives the answer sentence and then transfers the answer sentence to the first component; and a twenty-second step in which the first component receives the answer sentence.

6. The information processing method according to claim 5, wherein the fifth data and sixth data are vector data, and wherein in the seventeenth step, the search in the second database for the fifth data performed by the second component is a similarity search.

* * * * *